June 22, 1926.
J. PALMER
AUTOMOBILE BUMPER
Filed July 14, 1925
1,589,549
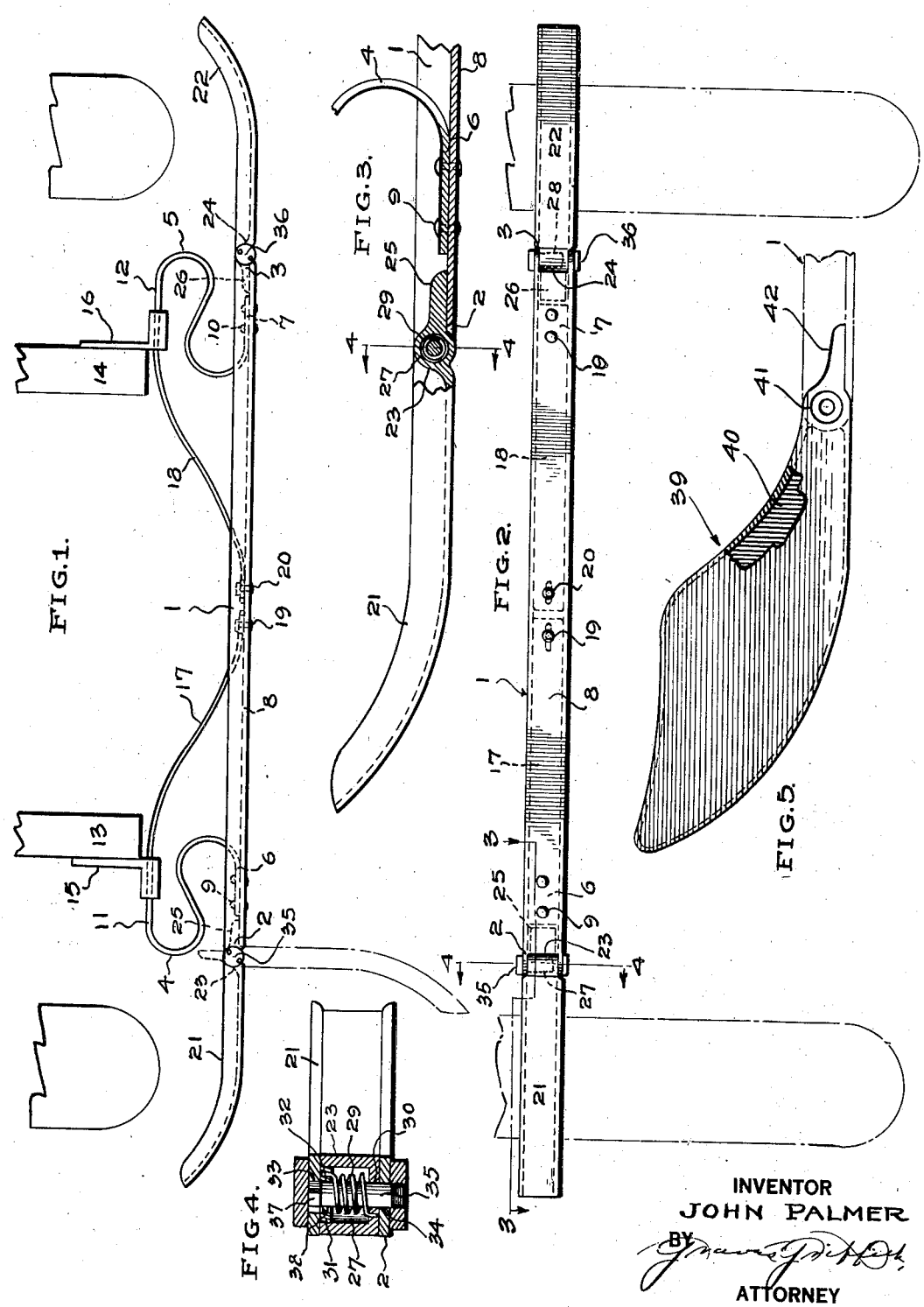
INVENTOR
JOHN PALMER
ATTORNEY Patented June 22, 1926.

1,589,549

UNITED STATES PATENT OFFICE.

JOHN PALMER, OF SAN FRANCISCO, CALIFORNIA, ASSIGNOR OF ONE-HALF TO JOSEPH H. HUNTSMAN, OF SAN FRANCISCO, CALIFORNIA, AND ONE-FOURTH TO CLARENCE J. WILLIAMS, OF SAN FRANCISCO, CALIFORNIA.

AUTOMOBILE BUMPER.

Application filed July 14, 1925. Serial No. 43,437.

The present invention relates to improvements in automobile bumpers, and more particularly to improved means adapted for hinged attachment in such manner to the extremities of the impact bars thereof that said hinged means may be swung forwardly in a substantially horizontal plane, relative to the impact bars, to permit the ready release of any object that may have become interlocked with said means, said hinged means being adapted to be held in normal position by means of coil, or other, springs and of a character, when in normal position, to present a substantially rigid front for the reception of frontally received thrusts and impacts.

It is quite obvious that a bumper constructed in accordance with the principles embodied in this invention will, in a great measure, overcome the difficulties encountered by motorists in disengaging cars, following collisions of front or rear-end character, due to interlocking of bumpers and fenders, as the hinged arrangement of the bumper extremities with the free forward swing, provide a ready aid to disentanglements of these members.

A principal object of the invention is the provision of an automobile bumper bearing hinged extremities adapted to swing forwardly with respect to the impact bars thereof, to release any object that may have become entangled or interlocked therewith, and that will, when in normal position, present a substantially rigid front to frontally received thrusts and impacts.

A further object is the provision of a bumper of a character incorporating all the desired resilient and protective qualities of the ordinary bumper, with the added automatically operative releasing feature.

An additional object is the provision of a bumper having hinged guards that are interchangeable and that may be readily replaced, when damaged.

Other objects and advantages will appear with reference to the subjoined specification and one sheet of drawings, in which—

Figure 1 is a plan view of a bumper constructed in accordance with my invention, the dot-and-dash position of one of the hinged guards indicating the limit of its forward swing for releasing an interlocked object;

Figure 2 is a front elevation thereof;

Figure 3 is an enlarged horizontal sectional detail, showing the manner of hingedly securing one of the guards to the impact bar, the section being taken on the line 3—3 of Figure 2;

Figure 4 is a transverse section of one of the hinge members, showing the method of mounting the springs and hinge pintles, the view being taken on the line 4—4 of Figures 2 and 3; and Figure 5 is a detail view of a slightly modified form of guard adapted to be constructed of light steel-plate, or cast aluminum.

Referring in detail to the drawings, in which an embodiment of my invention has been shown, the impact bar is shown as constructed of channel-iron bearing channel-iron extremities hingedly secured thereto. Though thus shown, it is to be understood that the impact element may be constituted of a plurality of bars united, and that these may be of either channel-iron or flat spring-steel, with hinged extremities, or guards, of similar material, these being largely matters of structural detail.

The embodiment shown in the drawings comprises an ordinary impact bar 1, constructed of channel-iron having bifurcated extremities forming hinge-ears 2 and 3 positioned substantially in alignment with the horns of the chassis, when installed upon an automobile, the impact bar being supported in the usual manner by means of S-spring members 4 and 5 attached at their ends 6 and 7 to the web 8 of said bar by means of sets of rivets 9 and 10, the sections 11 and 12 thereof being securable to the horns 13 and 14 of the chassis by means of clamping brackets, or like elements, 15 and 16, the bracing sections thereof 17 and 18 being secured centrally of the impact bar-web 8 by means of rivets 19 and 20.

The extremities, or guards, 21 and 22 are preferably curved, as shown, to form guards for the front wheels, and comprise members adapted for hinged securement to the ears 2 and 3 of the impact bar, said members being provided with bosses 23 and 24 adapted to fit between said ears and bearing integrally formed lugs 25 and 26 adapted for engagement with the inner face of the web 8 of the impact bar, to form stops to limit the further rearward movement of the guards 21 and 22. The bosses 23 and 24 are provided with concentrically positioned openings 27 and 28, forming spring-housings adapted to receive torsion springs 29, the ends of which are secured to the hinge-pintles and to the bosses 23 and 24, respectively, the said bosses being provided at their lower ends with concentrically positioned pintle-openings 30 communicating with the spring-housings 27 and 28, said spring-housings being provided with discs 31 adapted to be fitted therein above the springs 29 and bearing the pintle-openings 32 positioned in alignment with the openings 30, said openings being adapted for registration with the ear-openings 33 and 34 formed in the impact bar. Hinge-pintles 35 and 36 are inserted through the ear-openings 33 and 34, these being provided with squared sections 37 adjacent their heads, which fit the corresponding square openings 33 formed in the ears, to prevent their turning with the bosses 23 and 24, the discs being keyed to the pintles by pins 38 to provide a means for anchoring the upper ends of the springs 29 and 30 to bring the required spring urge to bear upon the hinged members, thereby holding said members in their normal positions with the lugs 25 and 26 bearing tightly against the inner face of the impact bar.

In the modified form shown in Figure 5, the guard 39 is preferably of cast aluminum, cored-out, as indicated at 40, and provided with an integrally formed boss 41 and lug 42, similar in character to those previously described.

Obviously, from the foregoing, if, in a collision, the bumpers of the two cars become interlocked at their extremities, their release may be readily effected by a backing of one or the other, or both, cars, the interlocked guard of my construction swinging freely forward in aid of their disentanglement.

Having thus described my invention, I claim, and desire to secure by Letters Patent:

1. An automobile bumper comprising an impact section provided with bifurcated extremities forming hinge-ears, end-guard sections having bosses forming spring housings adapted to fit between said bifurcated extremities of said impact sections, hinge pintles extending through said ears and spring housings, torsion springs surrounding said pintles and adapted to urge said guard sections rearwardly, and means co-acting with said guard sections in opposition to said spring urge, the said guard sections being free for forward swinging movement with respect to said impact section.

2. An automobile bumper comprising an impact section provided with bifurcated extremities forming hinge-ears, end-guard sections having bosses forming spring housings adapted to be embraced by said bifurcated extremities of the impact sections, hinge pintles extending through said ears and spring housings, means for holding said pintles against turning movement, springs surrounding said pintles and adapted to urge said guard-sections rearwardly, and lugs formed integral with said spring housings and adapted to limit the rearward movement of said guard sections relative to said impact section.

3. An automobile bumper comprising an impact section and end guard sections, said end guard sections having bosses bearing spring-housings and adapted for hinged connection to said impact section, spring means mounted in said housings and adapted for co-action with said guard sections to urge said guard sections rearwardly to normal position, and stop means formed integrally with the said bosses and adapted to limit the rearward movement of said guard sections, said guard sections being free for forward swinging movement to positions substantially at right angles to said impact section.

In testimony whereof I have affixed my signature.

JOHN PALMER.